(12) United States Patent
Dow et al.

(10) Patent No.: US 9,262,603 B2
(45) Date of Patent: Feb. 16, 2016

(54) ADVANCED AUTHENTICATION TECHNOLOGY FOR COMPUTING DEVICES

(75) Inventors: Eli M. Dow, Poughkeepsie, NY (US); Marie R. Laser, Poughkeepsie, NY (US); Sarah J. Sheppard, Poughkeepsie, NY (US); Jessie Yu, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 224 days.

(21) Appl. No.: 13/278,727

(22) Filed: Oct. 21, 2011

(65) Prior Publication Data

US 2013/0104227 A1 Apr. 25, 2013

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G06F 21/31* (2013.01)
*G06F 21/36* (2013.01)
*G06F 21/32* (2013.01)

(52) U.S. Cl.
CPC ............. *G06F 21/31* (2013.01); *G06F 21/316* (2013.01); *G06F 21/36* (2013.01); *G06F 21/32* (2013.01)

(58) Field of Classification Search
CPC .......... G06F 21/31; G06F 21/32; G06F 21/36
USPC .......... 713/182; 382/115, 116; 726/16, 17, 19
See application file for complete search history.

(56) References Cited

U.S. PATENT DOCUMENTS

| | | | |
|---|---|---|---|
| 6,351,634 B1 | 2/2002 | Shin | |
| 6,421,453 B1* | 7/2002 | Kanevsky et al. | 382/115 |
| 6,509,847 B1 | 1/2003 | Anderson | |
| 6,720,860 B1 | 4/2004 | Narayanaswami | |
| 7,124,433 B2 | 10/2006 | Little | |
| 7,305,559 B2 | 12/2007 | Schreiber et al. | |
| 8,046,721 B2 | 10/2011 | Chaudhri | |
| 8,079,079 B2* | 12/2011 | Zhang et al. | 726/19 |
| 2010/0281432 A1* | 11/2010 | Geisner et al. | 715/849 |
| 2012/0066650 A1* | 3/2012 | Tirpak et al. | 715/863 |
| 2012/0098750 A1* | 4/2012 | Allen et al. | 345/169 |
| 2012/0194440 A1* | 8/2012 | Ramrattan | G06F 3/04883 345/173 |
| 2013/0016122 A1* | 1/2013 | Bhatt et al. | 345/620 |

FOREIGN PATENT DOCUMENTS

WO WO 2011/038533 A1 * 4/2011

\* cited by examiner

*Primary Examiner* — Ashok Patel
*Assistant Examiner* — Daniel Potratz
(74) *Attorney, Agent, or Firm* — Cantor Colburn LLP; Steven Chiu

(57) ABSTRACT

Receiving an input authentication pattern, the input authentication pattern including non-alphanumeric input data. Determining if the input authentication pattern matches a previously stored authentication pattern. Providing access to a computing resource if the input authentication pattern matches the previously stored authentication pattern.

6 Claims, 6 Drawing Sheets

ADVANCED AUTHENTICATION TECHNOLOGY FOR COMPUTING DEVICES

BACKGROUND

This invention relates generally to processing within a computing environment, and more particularly to advanced authentication technology for computing devices.

Traditional text password based security systems often fail because users need to memorize multiple complicated passwords. Even the most complex passwords are vulnerable to keyloggers, which can intercept legitimate passwords and render them useless. Even less sophisticated techniques can be used to determine a password. Phishing, for example, which involves deceiving someone by providing them with a link that purports to be a legitimate site, but is instead a cleverly conceived fraudulent copy of the original site which is designed to capture their password, can compromise even a secure password. In some instances, even someone looking over one's shoulder in a crowded space to obtain a password may compromise a secure password.

Attempts by application developers and device manufacturers to add security to their systems often require obscure combinations of upper and lower case letters, numbers, and symbols. Although these techniques may be effective against brute force techniques of password discovery, they are still vulnerable to the methods described above. Furthermore, the addition of these requirements makes passwords more difficult to remember, which often leads to a user writing the password down, leaving them more vulnerable then they would otherwise have been.

BRIEF SUMMARY

An embodiment includes a method includes receiving an input authentication pattern, the input authentication pattern including non-alphanumeric input data. The method further includes determining if the input authentication pattern matches a previously stored authentication pattern. If the input authentication pattern matches the previously stored authentication pattern then access to a computing resource is provided.

An additional embodiment includes a system. The system includes an advanced authentication module in communication with a computer processor. The advanced authentication module is configured to receive an input authentication pattern, the input authentication pattern comprising non-alphanumeric input data. The advanced authentication module is determines if the input authentication pattern matches a previously stored authentication pattern. If the input authentication pattern matches the previously stored authentication pattern then access is provided to a computing resource.

A further embodiment includes a computer program product. The computer program product includes a tangible storage medium readable by a processing circuit and storing instructions for execution by the processing circuit for performing a method. The method includes receiving an input authentication pattern, the input authentication pattern comprising non-alphanumeric input data. The method further includes determining if the input authentication pattern matches a previously stored authentication pattern. If the input authentication pattern matches the previously stored authentication pattern then access to a computing resource is provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment of the present invention provides for advanced authentication technology for computing devices. In a touch screen environment, the position, and frequency of touches to a screen is used to authenticate a user. In an embodiment, a camera is used to detect a users motion, and uses the position and frequency of hand gestures to authenticate a user. In additional embodiments, an infrared emitter and receiver, a pressure sensitive device, an accelerometer, and/or other input device is used to input motions for authentication.

Rather than relying on the keyboard for input, which can be sensed via keyloggers, remote electro magnetic pulse (EMP) detectors, etc, other input mechanisms and devices are used to collect authentication information. These devices include touch screens, motion sensors, standard and infrared cameras, and pressure sensitive devices which are used to determine where, and how frequently one performs a certain motion or touch in order to provide a password.

In an embodiment, by encoding regions of the screen using, for example, quadrants, values are assigned to the regions, and are used to collect patterns for authentication. Subsequently, a sequence of touches in those quadrants that matches the original input would unlock the device. In an additional embodiment, every other input is ignored and the password is padded with irrelevant data (such as AABBC-CDD, AABACADB which both unlock a computer whose secret code is A_B_C_D).

Additional embodiments include detecting 1 to n, simultaneous touches to n distinct positions on the screen. This value is encoded into a single value such that a user must touch multiple positions on the screen "simultaneously" or nearly simultaneously. Nearly simultaneously is defined herein to mean multiple locations registered concurrently within some small threshold of time.

In further embodiments, gestures are also incorporated creating more sophisticated systems, such as swiping a finger or multiple fingers in a single direction or an arc, or drawing some other continuous line segment with varying direction.

Any of the above embodiments may be used alone or together. In addition, values of the spacing of intervals between inputs may be incorporated such that an identical value input registered in a different time signature than the recorded or key value would cause the input to fail.

Figure 1:
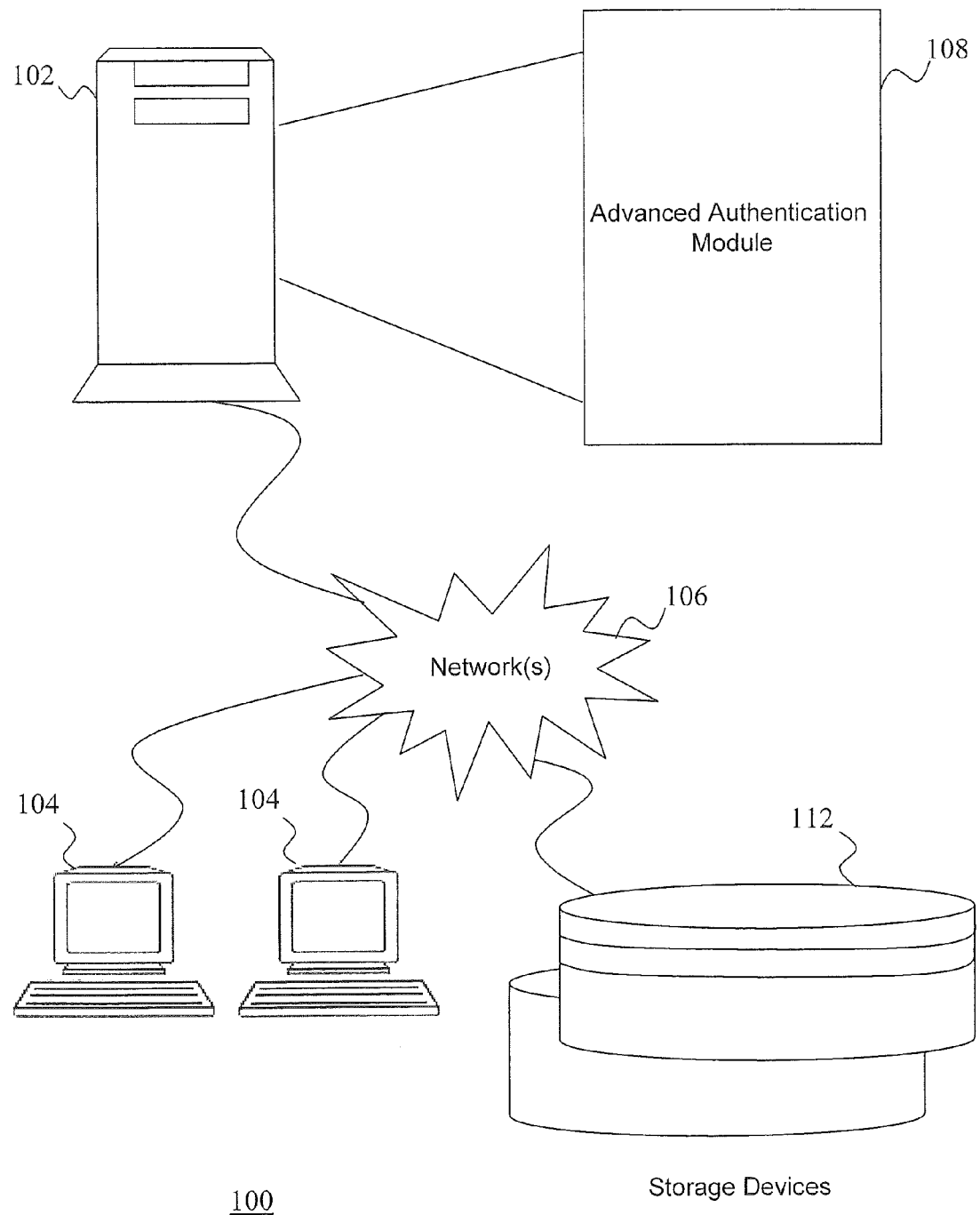
FIG. 1 depicts a schematic diagram of a system for implementing advanced authentication technology on computing devices that may be implemented in an embodiment.

Turning now to FIG. 1, a system 100 for implementing advanced authentication technology of computing devices will now be described. In an embodiment, the system 100 includes a computing device 102 executing computer instructions for advanced authentication. Computing device 102 may operate in any type of environment that is capable of executing a software application. Computing device 102 may comprise a high-speed computer processing device, such as a mainframe computer, to manage the volume of operations governed by an entity for which the advanced authentication instructions are executing. In additional embodiments, the computing device 102 may be a personal computer (e.g., a lap top, a personal digital assistant, a mobile device, a mobile telephone, a network device, a hardware appliance, a physical security mechanism, or a consumer electronic device) or host attached terminals. In an embodiment, the computing device 102 is part of an enterprise (e.g., a commercial business) that implements the advanced authentication.

In an embodiment, the system 100 depicted in FIG. 1 includes one or more client systems 104 through which users at one or more geographic locations may contact the computing device 102. The client systems 104 are coupled to the computing device 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the computing device 102 (e.g., by providing an applet to the client system 104). Client systems 104 may be operated by authorized users (e.g., programmers) of the advanced authentication described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the computing device 102 through multiple networks (e.g., intranet and Internet) so that not all client systems 104 are coupled to the computing device 102 through the same network. One or more of the client systems 104 and the computing device 102 may be connected to the networks 106 in a wireless fashion. In one embodiment, the networks 106 include an intranet and one or more client systems 104 executing a user interface application (e.g., a web browser) to contact the computing device 102 through the networks 106. In another embodiment, the client system 104 is connected directly (i.e., not through the networks 106) to the computing device 102 and the computing device 102 contains memory for storing data in support of advanced authentication. Alternatively, a separate storage device (e.g., storage device 112) may be implemented for this purpose.

In an embodiment, the storage device 112 includes a data repository with data relating to advanced authentication by the system 100, as well as other data/information desired by the entity representing the computing device 102 of FIG. 1. The storage device 112 is logically addressable as a consolidated data source across a distributed environment that includes networks 106. Information stored in the storage device 112 may be retrieved and manipulated via the computing device 102 and/or the client systems 104. In an embodiment, the storage device 112 includes one or more databases containing, e.g., authentication data and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The computing device 102 depicted in the system of FIG. 1 may be implemented using one or more servers operating in response to a computer program stored in a storage medium accessible by the server. The computing device 102 may operate as a network server (e.g., a web server) to communicate with the client systems 104. The computing device 102 handles sending and receiving information to and from the client systems 104 and can perform associated tasks. The computing device 102 may also include a firewall to prevent unauthorized access to the computing device 102 and enforce any limitations on authorized access. For instance, an administrator may have access to the entire system and have authority to modify portions of the system. A firewall may be implemented using conventional hardware and/or software as is known in the art.

The computing device 102 may also operate as an application server. The computing device 102 executes one or more computer programs to provide the advanced authentication. Computing device 102 includes an advanced authentication module 108. As indicated above, processing may be shared by the client systems 104 and the computing device 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the advanced authentication system described in FIG. 1 may be implemented in hardware, software executing on a general purpose computer, or a combination thereof.

Figure 2:
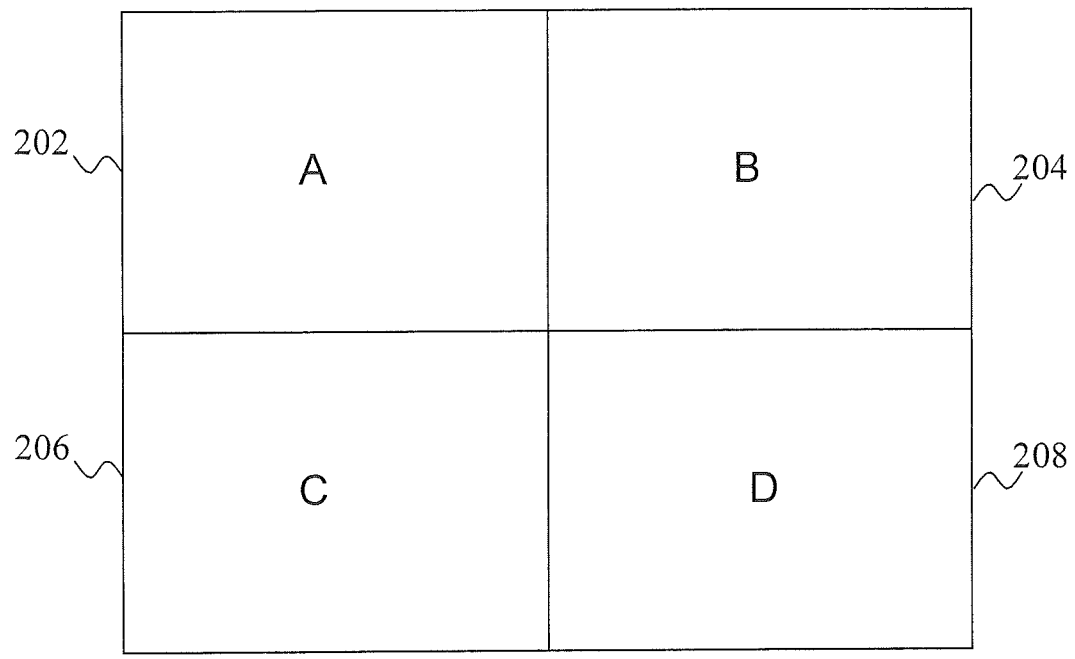
FIG. 2 depicts a schematic diagram of an input mechanism in an embodiment.

FIG. 2 is a schematic diagram of an input mechanism in an embodiment. In an embodiment, the input mechanism 200 of FIG. 2 is provided by an advanced authentication module, such as the advanced authentication module 108 of FIG. 1. The input mechanism 200 is divided into sections: section A 202, section B 204, section C 206, and section D 208. Each of the sections is used to input pattern elements to a device. A combination of one or more pattern elements is used to create an authentication pattern. Once an authentication pattern is established, entering the same authentication pattern serves to authenticate a user, thereby allowing the user to access the device, and/or an application executing on the device.

In an embodiment, the pattern is entered by touching the section on a touch sensitive input device (i.e. a touch screen display, a trackpad, a pen tablet, etc.). For example, to enter a pattern AABD, a user touches section A 202, then touches section A 202 again, then touches section B 204, and finally touches section D 208. In an embodiment, security is enhanced by adding extra pattern elements that are ignored (i.e. inactive pattern elements). For instance, the advanced authentication module 108 may be configured to ignore every other pattern element. Therefore, a pattern of AABD would be valid for entries such as AABABBCD or BACADBDD. In an additional embodiment, security is enhanced by including the tempo of entry of the pattern elements as part of the authentication pattern. Using tempo would require not only the correct sequence of pattern elements in the authentication pattern, but also the correct spacing of time between each of the entries.

It will be understood that any combinations of the above referenced entry and authentication mechanisms may be used together. It will further be understood that although FIG. 2 illustrates only 4 segments, the entry point can be configured to into a grid of two or more divisions. In addition, the divisions may be displayed on screen during entry, or hidden from view. In an embodiment, the divisions are configured into varying shapes and sizes and distributed over the screen to further obfuscate entry of the pattern.

In addition, although the grid has been describe with reference to a screen or device, it will be understood that patterns may be entered using gestures in front of a motion capture device such as an infrared or standard camera as will be described in more detail below.

Figure 3:
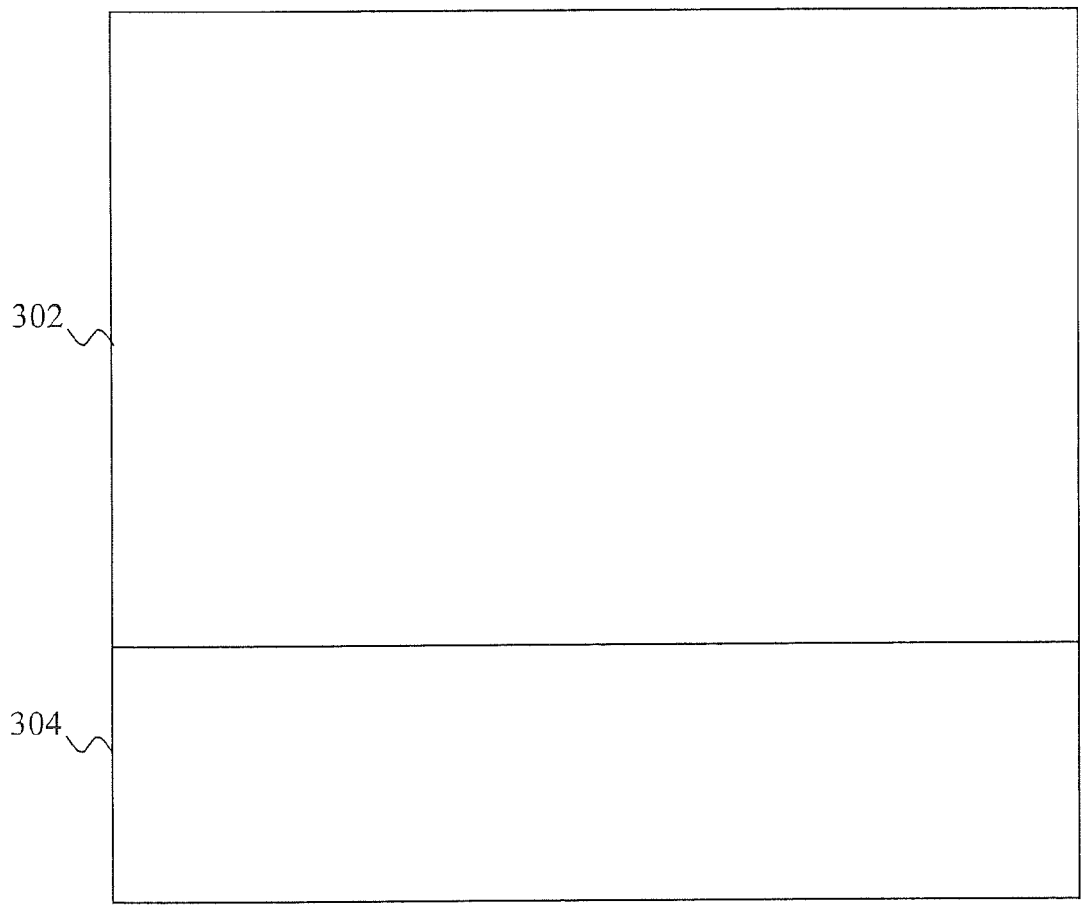
FIG. 3 depicts a schematic diagram of a multi entry input mechanism in an embodiment.

FIG. 3 depicts a schematic diagram of a multi entry input mechanism in an embodiment. In an embodiment, the input mechanism 300 of FIG. 3 is provided by an advanced authentication module, such as the advanced authentication module 108 of FIG. 1. In an embodiment, the input mechanism 300 is divided into multiple parts with each of the parts comprising a different style of input. In an embodiment, a lower section 304 is used to input piano key strokes, while an upper section 302 is used to input a motion based pattern. An authentication pattern is the combination of a pattern, such as a circle, being swiped on the upper section 302, while a user inputs a series of taps, such as a piano chord, on the lower section 304. The authentication pattern is stored as a combination of the two simultaneous patterns, and an authentication would depend on the entry of the two same patterns simultaneously or nearly simultaneously.

Figure 4:
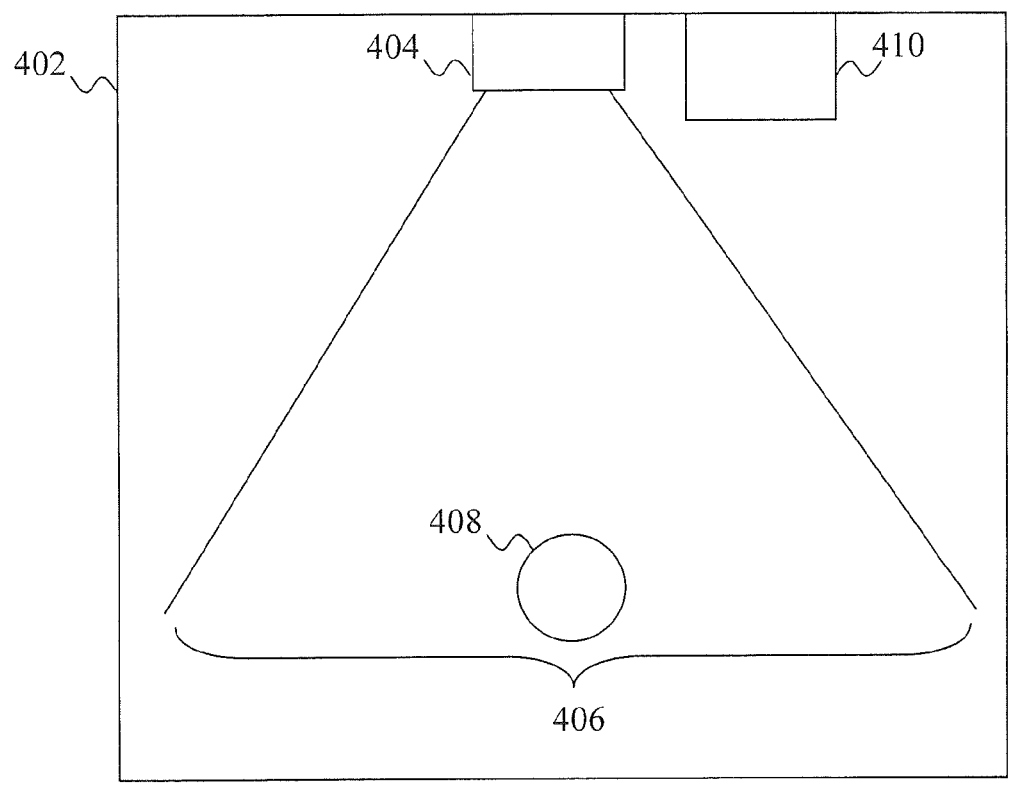
FIG. 4 depicts a schematic diagram of a video based input system in an embodiment.

FIG. 4 depicts a schematic diagram of a video based input system in an embodiment. In an embodiment, the input mechanism 400 of FIG. 4 is provided by an advanced authentication module such, as the advanced authentication module 108 of FIG. 1. In an embodiment, a room 402 includes a motion input device 404. The motion input device 404 may be a standard video camera, an infrared camera, or a combination of the two. In additional embodiments, the motion input device 404 may be any type of motion capture device as is known in the art. The motion input device 404 captures motion within a motion range 406. Motion is captured when an individual 408 performs a motion within the motion range 406. Patterns are input by the individual 408 using any type of motion, either using their fingers, their hands, or their entire body. In an embodiment, the individual 408 receives feedback from a monitor 410. The monitor 410 may be any device capable of video playback. The monitor 410 is in communication with the advanced authentication module 108 of FIG. 1 and receives a video feed from the motion input device 404. In an embodiment, a grid, such as the grids of FIGS. 2 and 3 may be overlaid on the video playing on the monitor 410 to assist the individual 408 in entering the authentication pattern. The monitor 410 may be directly connected the advanced authentication module 108, or connected over a network.

In an embodiment, the motion of the individuals is stored as any of the authentication patterns discussed above. In addition, any combination of motions or gestures may be used as an authentication pattern.

Figure 5:
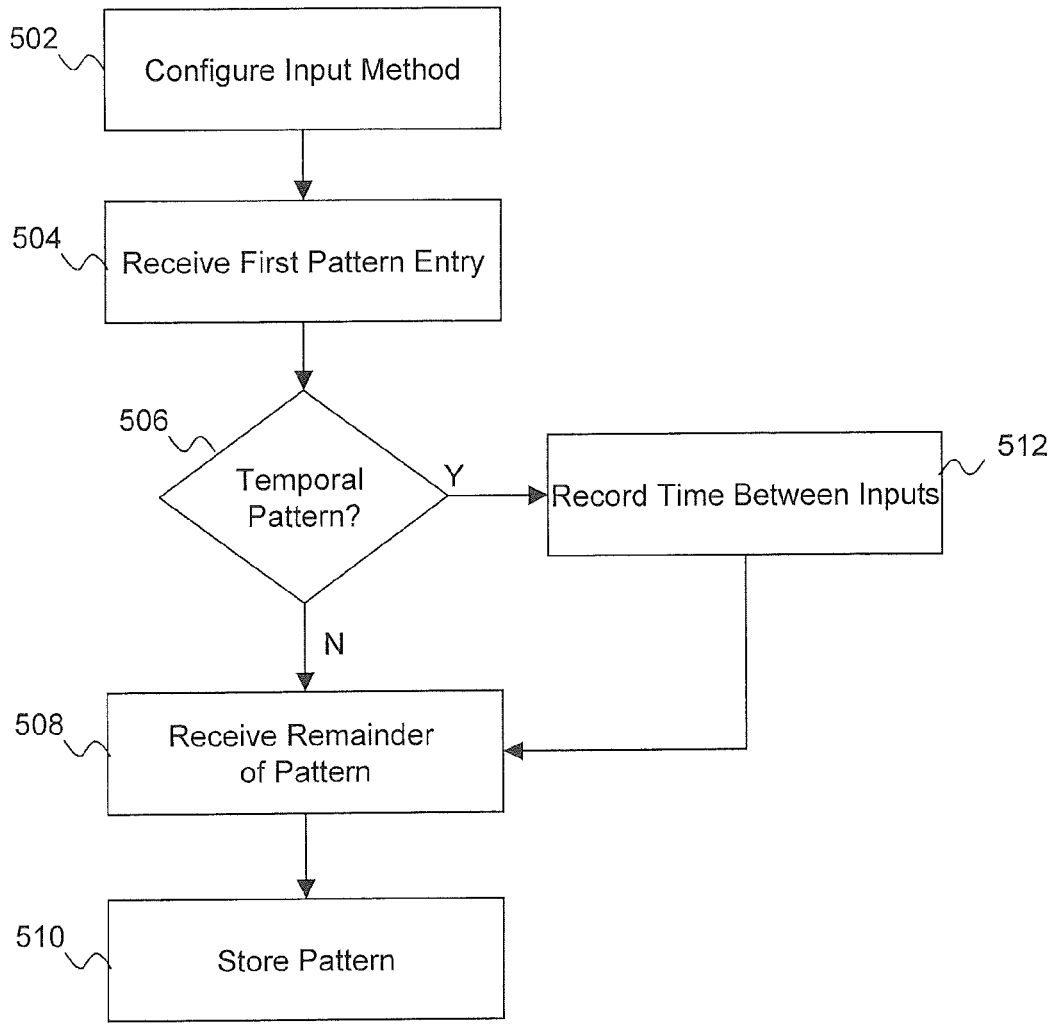
FIG. 5 depicts a process flow for setting an authentication pattern that may be implemented in an embodiment.

FIG. 5 depicts a process flow for setting an authentication pattern that may be implemented in an embodiment. In an embodiment, the process flow of FIG. 5 is executed on the advanced authentication module 108 of FIG. 1. At block 502, the input method for receiving an authentication pattern is configured. The input configuration is selected from the various methods disclosed above, and is dependent on the available hardware. For example, touch gestures are only available for devices equipped with a mechanism for capturing the touch gestures. Once the input method is configured, at block 504 the first entry in the pattern is received. At block 506, it is determined if the pattern is configured to use a temporal pattern. If the pattern is not temporal, then at block 508 the remainder of the authentication pattern is received. At block 510, the authentication pattern is stored.

Returning to block 506, if the pattern is temporal, then at block 512, the time between entries is recorded and processing continues at block 508.

Figure 6:
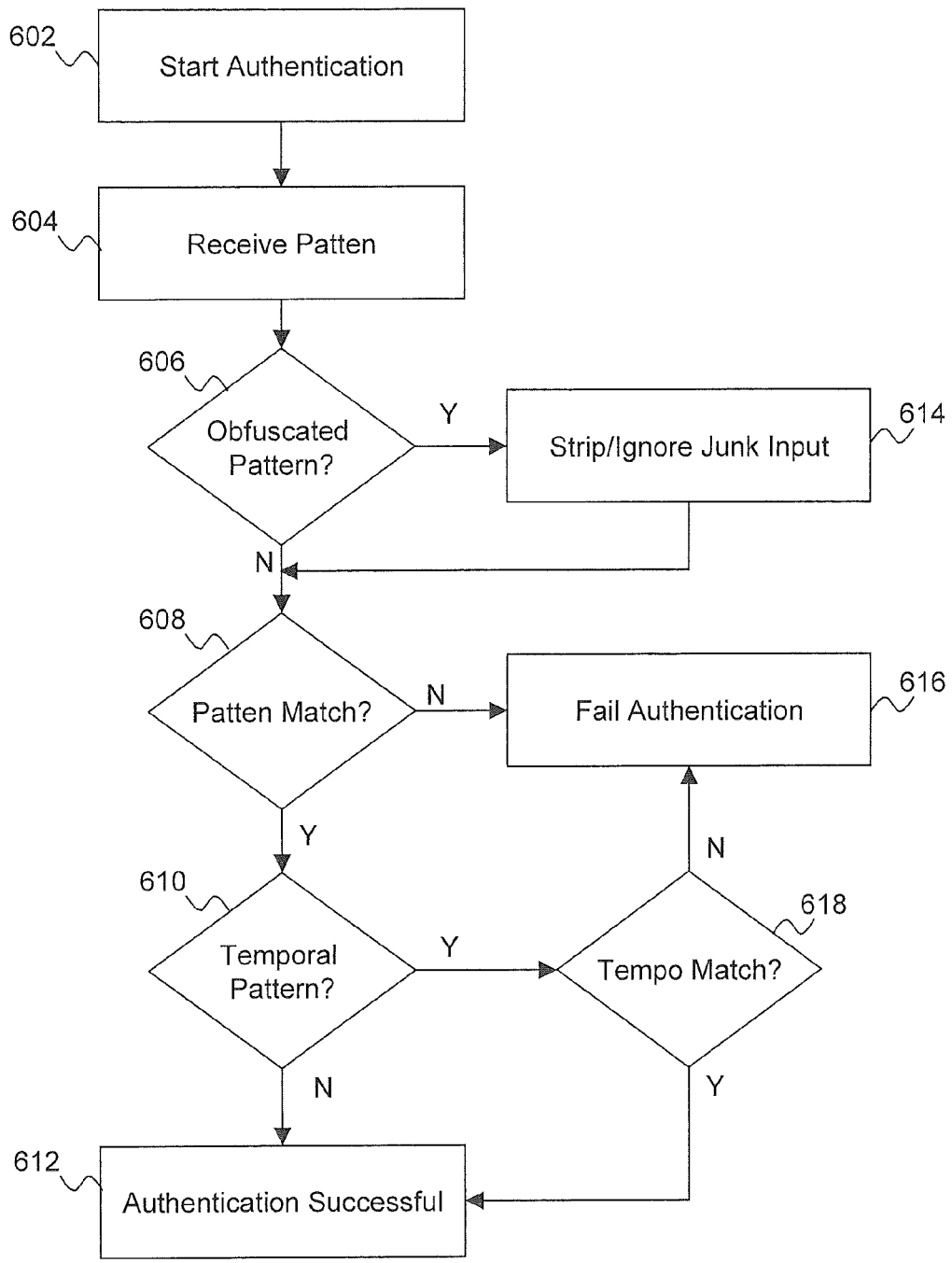
FIG. 6 depicts a process flow for receiving an authentication pattern that may be implemented in an embodiment.

FIG. 6 depicts a process flow for receiving an authentication pattern that may be implemented in an embodiment. In an embodiment, the process flow of FIG. 6 is executed on the advanced authentication module 108 of FIG. 1. At block 602, an authentication process is initiated. In an embodiment, the authentication process is initiated by selecting an option on the computing device. In an additional embodiment, turning on, or activating the computing device initiates the authentication process. In a further embodiment, the authentication process is initiating by inputting the authentication pattern. At block 604, the authentication pattern is received. At block 606, it is determined if the authentication pattern is configured to support obfuscation. If obfuscation is not supported, then at block 608 it is determined if the received authentication pattern matches a previously stored pattern. If it is determined that the received authentication pattern matches the previously stored authentication pattern, then at block 610 it is determined if the authentication pattern is configured to support a temporal authentication pattern. If the authentication pattern is not configured to support the temporal authentication pattern, then at block 612, authentication is successful, and access to the computing resource (i.e. a computing device, software application, etc.) is allowed.

Returning to block 606, if the authentication pattern is configured to support obfuscation, then at block 614, the inactive part of the pattern (i.e. the parts determined to be non-pattern data) are stripped from or the received authentication pattern, and the stripped part of the authentication pattern is processed from block 608. In an embodiment, the inactive part of the pattern is ignored. Returning to block 608, if the received authentication pattern, or the stripped authentication pattern does not match the previously stored authentication pattern, then at block 616 authentication fails, and access to the computing device, or software application is denied.

Returning to block 610, if it is determined that the authentication pattern is configured to support a temporal pattern, then at block 618, it is determined if the input tempo of the received authentication pattern matches the tempo of the previously stored authentication pattern. If the tempo does not match, then authentication fails at block 616. If the temp matches, then authentication is successful at block 612.

Technical effects and benefits include a secure method of authentication without requiring an alphanumeric password. An additional benefit includes the ability to input an authentication pattern in the presence of others without revealing the authentication pattern based on a temporal pattern, and/or obfuscation of the authentication pattern. A further benefit is the ability to input authentication patterns using various methods and input devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    receiving a first non-alphanumeric input authentication pattern at a first section comprising a first spatial region of a plurality of spatial regions of a single touch screen of a computer, the touch screen being divided into the plurality of spatial regions, wherein each of the plurality of spatial regions does not overlap any of the remaining spatial regions of the touch screen, the first section being associated with a first input style, wherein the first spatial region is located in a top portion of the single touch screen, and wherein the first input style comprises a swipe of a motion-based pattern;
    receiving a second non-alphanumeric input authentication pattern at a second section of the touch sensitive input device, the second section comprising a second spatial region of the plurality of spatial regions of the touch screen that is distinct from the first spatial region and being associated with a second input style that is different than the first input style, wherein the second spatial region is located in a bottom portion of the single touch screen, such that the entirety of the second spatial region is located underneath the entirety of the first spatial region, and wherein the second input style comprises a series of taps received by the second portion of the touch screen, such that the series of taps are received nearly simultaneously with the swipe of the motion based pattern;
    determining, on the computer, that the first non-alphanumeric input authentication pattern and the second non-alphanumeric input authentication pattern match a previously stored authentication pattern; and
    providing access to a computing resource responsive to determining that the first non-alphanumeric input authentication pattern and the second non-alphanumeric input authentication pattern match the previously stored authentication pattern.

2. The method of claim 1, wherein the previously stored authentication pattern includes a temporal pattern, and the determining includes comparing the temporal pattern of the previously stored authentication pattern and time between the first non-alphanumeric input authentication pattern and the second non-alphanumeric input authentication pattern.

3. A computer system comprising:
    a computer processor;
    an input mechanism comprising a single touch screen divided into a plurality of spatial regions, wherein each of the plurality of spatial regions does not overlap any of the remaining spatial regions of the touch screen;
    the computer system configured to:
    receive a first non-alphanumeric input authentication pattern at a first section of the touch screen, the first section comprising a first spatial region of the plurality of spatial regions, the first section being associated with a first input style, wherein the first spatial region is located in a top portion of the single touch screen, and wherein the first input style comprises a swipe of a motion-based pattern;
    receive a second non-alphanumeric input authentication pattern at a second section of the touch screen, the second section comprising a second spatial region of the plurality of spatial regions of the touch screen that is distinct from the first spatial region and being associated with a second input style that is different than the first input style, wherein the second spatial region is located in a bottom portion of the single touch screen, such that the entirety of the second spatial region is located underneath the entirety of the first spatial region, and wherein the second input style comprises a series of taps received by the second portion of the touch screen, such that the series of taps are received nearly simultaneously with the swipe of the motion based pattern;
    determine that the first non-alphanumeric input authentication pattern and the second non-alphanumeric input authentication pattern match a previously stored authentication pattern; and
    provide access to a computing resource responsive to determining that the first non-alphanumeric input authentication pattern and the second non-alphanumeric input authentication pattern match the previously stored authentication pattern.

4. The system of claim 3, wherein the previously stored authentication pattern includes a temporal pattern, and the determining includes comparing the temporal pattern of the previously stored authentication pattern and time between the first non-alphanumeric input authentication pattern and the second non-alphanumeric input authentication pattern.

5. A computer program product comprising:
    a tangible non-transitory storage medium readable by a processing circuit and storing instructions for execution by the processing circuit for performing a method comprising:
    receiving a first non-alphanumeric input authentication pattern at a first section comprising a first spatial region of a plurality of spatial regions of a single touch screen of a computer, the touch screen being divided into the plurality of spatial regions, wherein each of the plurality of spatial regions does not overlap any of the remaining spatial regions of the touch screen, the first section being associated with a first input style, wherein the first spatial region is located in a top portion of the single touch screen, and wherein the first input style comprises a swipe of a motion-based pattern;

receiving a second non-alphanumeric input authentication pattern at a second section of the touch sensitive input device, the second section comprising a second spatial region of the plurality of spatial regions of the touch screen that is distinct from the first spatial region and being associated with a second input style that is different than the first input style, wherein the second spatial region is located in a bottom portion of the single touch screen, such that the entirety of the second spatial region is located underneath the entirety of the first spatial region, and wherein the second input style comprises a series of taps received by the second portion of the touch screen, such that the series of taps are received nearly simultaneously with the swipe of the motion based pattern;

determining, on the computer, that the first non-alphanumeric input authentication pattern and the second non-alphanumeric input authentication pattern match a previously stored authentication pattern; and providing access to a computing resource responsive to determining that the first non-alphanumeric input authentication pattern and the second non-alphanumeric input authentication pattern match the previously stored authentication pattern.

6. The computer program product of claim 5, wherein the previously stored authentication pattern includes a temporal pattern, and the determining includes comparing the temporal pattern of the previously stored authentication pattern and time between the first non-alphanumeric input authentication pattern and the second non-alphanumeric input authentication pattern.

* * * * *